United States Patent [19]
Foster et al.

[11] Patent Number: 5,181,653
[45] Date of Patent: Jan. 26, 1993

[54] RESIDENTIAL HEATING AND AIR CONDITIONING CONTROL SYSTEM

[76] Inventors: Glenn D. Foster, 10100 Baymeadows Rd., Apartment 1124, Jacksonville, Fla. 32256; Charlie Moses, 4314 S. Naranja Dr., Jacksonville, Fla. 32217

[21] Appl. No.: 845,111

[22] Filed: Mar. 3, 1992

[51] Int. Cl.5 .................. G05D 23/00; F24F 3/44
[52] U.S. Cl. .................. 236/49.3; 236/1 B; 236/46 R; 165/22
[58] Field of Search .............. 236/46 R, 47, 49.3, 236/51, 46 F, 1 B; 165/12, 22; 62/161, 163, 164

[56] References Cited

U.S. PATENT DOCUMENTS

| | | | |
|---|---|---|---|
| 4,339,073 | 7/1982 | Staloff | 236/47 |
| 4,819,714 | 4/1989 | Otsuka et al. | 236/46 R |
| 4,997,029 | 3/1991 | Otsuka et al. | 236/46 R |

*Primary Examiner*—Harry B. Tanner

[57] ABSTRACT

A temperature control system for a residential zoned forced air system which maintains programmed temperature setpoints for specific periods in each zone having hold, override, and vacation modes which can temporarily alter the programmed temperature setpoints and time periods for either individual zones or all zones until the next programmed time or the temporary modes are released.

3 Claims, 2 Drawing Sheets

RESIDENTIAL HEATING AND AIR CONDITIONING CONTROL SYSTEM

BACKGROUND OF THE INVENTION

1. Field of the Invention

The present invention relates generally to a duct type air conditioning system for a multi-zone space, and more particularly, to a variable air quantity control system capable of regulating temperature in each zone independently of each other in accordance with a time and temperature schedule.

2. Description of the Prior Art

Conventional residential air conditioning systems (which can provide both heating and cooling) are typically controlled with a single thermostat. Accordingly, the one set point in the thermostat will cause the temperature in the vicinity of the thermostat to be controlled to the desired level, but in other parts of the residence the temperature can vary widely due to heat load through windows, shading of spaces, heat generated by people or equipment, and various other factors. Thus, certain places in homes require more or less temperature control than others. Upstairs areas have drastically different heating/cooling requirements than downstairs areas or basements. Bedroom areas need temperature control only at certain times of the day or night. Homes with large areas of glass present several problems for maintaining a comfortable temperature. Most residences have areas that are exposed to direct sunlight during certain hours. In both Summer and Winter, those zones require different levels of heating or cooling than other part zones of the home. With a single centrally-located thermostat it is impossible to have optimum temperatures in all zones/rooms at all times. In a zoned residence, however, individual zones with differing heating/cooling properties and hours of use can be kept at optimum temperatures. One zoning method uses separate heating and cooling units to maintain different comfort levels in different parts of the residence. However, each system uses its own thermostat which is centrally located in a zone to be maintained by the respective system, but, because the separate units do not function as a system, they may over lap in heating and cooling some areas and perform as two independent systems.

To overcome the added installation costs, added expense to operate, and the overlap problems with dual equipment zoned systems, the use of one heating and cooling unit with a series of thermostats in each room can be provided. A single unit zoned system allows different parts of a residence to be controlled at different temperatures at different times by programming each thermostat in each zone for a desired temperature over a period of time. Although the one zoned heating and cooling unit offers cost savings, greater comfort, and greater flexibility by allowing the homeowner to set different temperatures throughout the house only during times of need or occupancy, these single heating and cooling units with multiple programmable thermostats also have some disadvantages. Conventional one heating and cooling zoned systems allow each individual thermostat to turn on the heating and cooling unit and operate the zone damper in the respective zones. In practice, this system is quite complicated to operate and inefficient because the several individual thermostats can turn the heating and cooling unit ON and OFF and each zone must be individually programmed for the desired temperature and schedule, and there is no central control. Often it is desirable to temporarily change a current setpoint in a single zone during the pre-set program period. Further, it is often desirable to temporarily prevent the current set point in a zone from changing with a pre-set program schedule. Still further, it is often desirable to temporarily change all zone setpoints and time schedules, e.g. during vacation periods. These problems require the user to re-program the controller for a short period and then re-program the controller again shortly thereafter to set in the original schedule.

SUMMARY OF THE INVENTION

Therefore, it is an object of the present invention to provide an improved residential zone control system which would allow the desired temperature in a single of a zoned system to be overridden for one period of a schedule with re-programming the original schedule.

It is another object of the present invention to provide an improved residential control system which would allow a single zone of a zoned system to be held at the present temperature until the desired temperature schedule is again requested.

It is a further object of the present invention to provide an improved residential control system which would allow the desired temperature in all zones of a zoned system to be held at a common set point for an unspecified period of time and then allowed to return to an original schedule without re-programming the controller.

These and other objects of the present objective are attained by a one heating and cooling unit zoned system comprising a single master programmable thermostat for programming desired temperatures and schedules for a plurality of zones, a plurality of zone dampers controlling the desired temperature in a respective one of the zones, individual zone temperature measuring means for measuring the actual temperature in a respective zone and for overriding the desired temperature set point of the master thermostat in a respective zone for one period of a pre-set schedule. The master thermostat also causes the current setpoints of all zones to remain at the last setpoints entered for as long as it is desired not to allow the current setpoints to change with time, but then to release the hold on all set points to the original programmed schedule. The master thermostat also allows the current set points and schedules for all zones to be "set-back" simultaneously until release to the original programmed schedule.

BRIEF DESCRIPTION OF THE DRAWINGS

Still other objects and advantages of the present invention will be apparent from the following detailed description in conjunction with the accompanying drawings in which reference numerals designate like or corresponding parts throughout the same, in which.

DESCRIPTION OF THE PREFERRED EMBODIMENT

Figure 1:
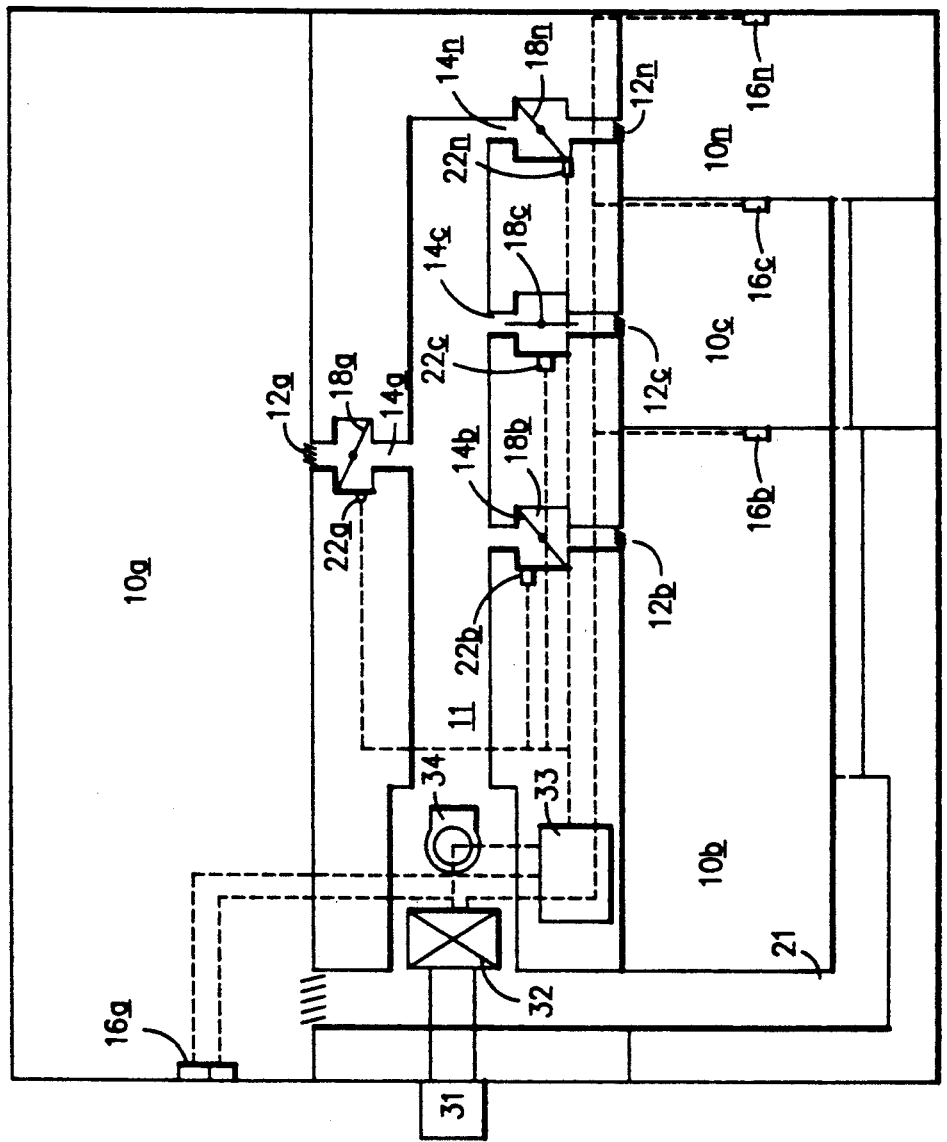
FIG. 1 is a schematic illustration of a residential zone duct type air conditioning system and a control therefore according to the principles of the present invention.

Referring to FIG. 1, the various components of a duct type air conditioning system for a multi-zone residence are shown together with their controls which are adapted to operate in accordance with the present invention. A plurality of zones in which the temperature is to be controlled is schematically illustrated as a space or room generally designated by numeral 10a,b,c,n, and defined by walls, floors, ceilings, and the like with a supply air register 12a,b,c,n, or other device, provided for supplying conditioned air to each zone. A supply duct system 11 is connected to each register 12 and includes a segment of branch duct 14a,b,c,n, incorporated into the supply duct 11 to control the flow of conditioned air into each space or zone 10. A master thermostat generally designated as numeral 16a, and a plurality of slave thermostats/temperature sensor devices generally designated by numeral 16b,c,n are mounted on suitable surfaces, such as a wall surface, or the like, in the respective zones 10 to be controlled for modulating a damper blade 18a,b,c,n in the branch duct 14 thereby controlling the inflow of conditioned air into the respective zones 10.

The elongated branch ducts 14 are of tubular construction and, are generally of cylindrical or rectangular configuration. However, the shape and configuration and the size of the duct may vary depending upon the installation requirements. Each branch duct 14 is provided with a control box 22a,b,g,n, mounted externally of the duct 14 to receive a control signal from the master thermostat or slave thermostat in order to pivot a damper blade 18a,b,c,n, about a central shaft which extends diametrically each branch duct 14. A control box 22a,b,c,n, is attached to each duct 14 and is provided with an electrical motor to drive the damper shaft of the damper blade between open and closed positions. Return duct 21 returns air from the conditioned spaces to the heating/cooling unit. The heating/cooling unit generally comprises an outdoor heat exchange coil and compressor 31 and an indoor heat exchange coil in an air conditioning system or a heat pump system, and/or a furnace 33 with a blower 34, which may be a variable speed blower, for moving air through the supply duct 11.

Figure 2:
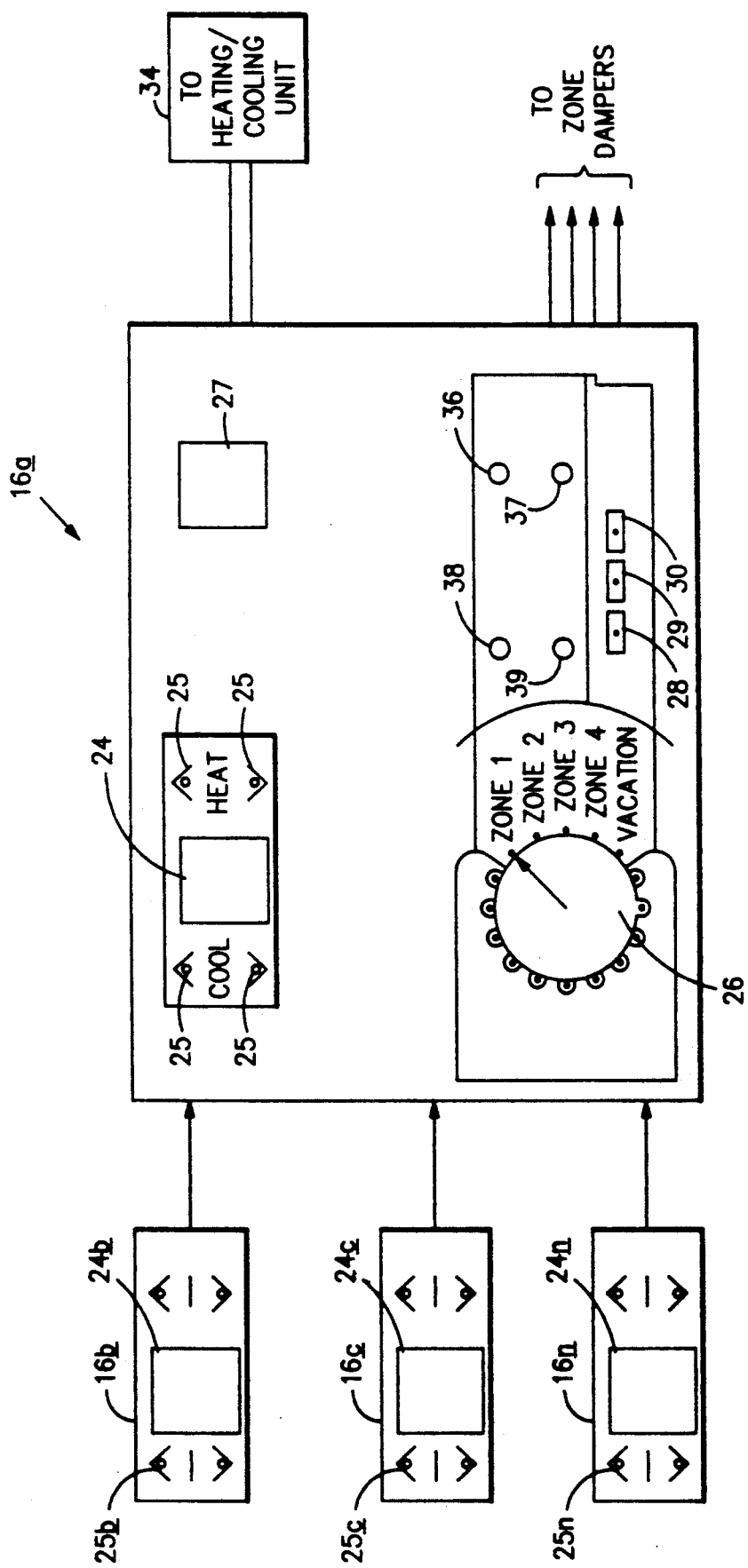
FIG. 2 is a block diagram of the control according to the principles of the present invention.

Referring now to FIG. 2 there is shown a block diagram of a four-zone control system. It is recognized that the system of the present invention could easily be adapted to control more or less than four zones. The zoning control system includes a master thermostat 16a and a plurality of slave thermostats 16b,c,n. The master thermostat 16a includes, for example, a microprocessor having its inputs/outputs connected to each of the slave thermostats by an I/0 driver or the like. The master thermostat is 16a is also arranged to produce a plurality of output signals for application to a heating/cooling unit 34 and a plurality of motorized dampers 18. The thermostats control signals in response to the difference between the actual temperature sensed in each zone by the respective thermostat and a desired setpoint programmed into the master thermostat by the user. The thermostats 16a,b,c,n include a 4-digit display 24, preferably a liquid crystal device, which will display the thermostat setpoint which may be adjusted at the thermostat within the range of the thermostat. Adjacent the display 24 is a plurality of actuating button 25 associated with upwardly directed and downwardly directed arrows for setting a desired heating/cooling setpoint in each zone. Each time any button 25 is actuated it will increase or decrease by one the digit indicated at the readout to raise or lower the desired setpoint. For example, to raise the temperature setpoint in cooling, depress the top left button 25 once for each additional degree desired to raise the setpoint temperature. The display 24 also includes a digital readout of the actual temperature sensor by a sensor in the thermostat in the respective zone.

The master thermostat 16a further includes a zone selector switch 26, for example a rotary switch, used to switch between selected zones in order to display the setpoints and actual temperatures in the respective zones on the display 24. Further, the master thermostat 16a has a clock display 27, preferably a liquid crystal device which displays the hour, minutes, AM or PM, and the day. The master thermostat 16a also includes a heat switch 28, a cool switch 29, and a fan switch 30. The heat switch 28 and the cool switch 29 each have an OFF position for preventing heating or cooling and AUTO position in which heat or cool is allowed if the thermostat is calling for either heat or cooling. The fan switch 30 has an ON position in which the blower fan 34 will stay on continually, and AUTO position which will enable the blower fan 34 only when heating or cooling is required.

The master thermostat 16a also has a plurality of switch buttons which perform certain programming functions. Switch button 36 (with indicia SELECT MIN/HR/DAY) selects the minutes/hours/day which is indicated on display 27. Switch button 37 (with indicia ADVANCE TIME/DAY) advances the time and day on the display 27. For example, to set the minutes, press the switch button 36 once, then press the switch button 37 to scroll to the proper minutes. Sequentially pressing the switch button 36 will scroll the selection through minutes, hours, and days. Switch 38 (with indicia SET TIME/TEMP SCHEDULES) sets the time and temperature schedule in the master thermostat 16a. To program master thermostat 16a press the switch button 38 and the word "PROGRAM" will be shown on a display 24. Next, select a zone to be programmed using the zone selector switch 26. Then, select a weekly period by pressing the switch button 37 to select weekdays as weekly periods to program. This will be displayed on the display 27 as "MTWTHF". Pressing the switch button 37 a second time will change the clock display from "MTWTHF" to "SA" for Saturday. A third press will change the display to "SU" for Sunday. A fourth press will bring the controller back to "MTWTHF".

There are four start times that can be programmed in each weekly period. The programming can be accomplished as follows: Press the switch 36 to program the start times for the selected weekly periods, by pressing the switch button 36 once the first program start time is shown on the display 27 and the setpoints with the word "program" for the start time are shown on display 24. To only view the start times and setpoints for each start time, press the switch button 36 a second time. This will display the second start time and setpoints. Additional, presses display the start times three and four, and then returns to the weekly display. To program the start time, press the switch button 36 to get back to the start time, then press switch button 37 until the desired hour on the display 27 is obtained. While in this mode adjust the setpoints to the desired temperatures using the switch buttons 25 for adjusting the temperature up and down for the time period currently displayed in the display 27. This process is repeated until all time periods are programmed. The slave thermostats 16b,c,n, include a display similar to display 24 in the master thermostat 16a control buttons for adjusting the temperature of the heating and cooling either up or down.

The temperature setpoints in any single zone can be temporarily altered at any thermostat 16a,b,c,n by pressing the switch buttons 25a,b,c,n which will change the current temperature being controlled in only the zone controlled by the respective thermostat and only for the current program time period, whereupon at the end of the current program time period the previously programmed desired temperatures and time periods set in the master thermostat 16a will be again maintained. In this mode, the current setpoints can be changed to any value in the setpoint range and once the setpoints are temporarily adjusted, they will not change until the next programmed time period.

The master thermostat 16a has a hold temperature switch button 39 (with indicia HOLD TEMPERATURES), which when pressed will prevent the current setpoints from changing with time in accordance with the programmed schedule and allow these current setpoints to remain at the last values entered i.e. the current setpoint for as long as this hold mode is active. To release this hold mode, the hold switch button 39 must be pressed a second time, whereupon the previously programmed desired temperatures and time periods will again be maintained.

The zone selector switch 26 has a vacation mode which is enabled when the switch is in the vacation position. The vacation setpoints, which are generally set back temperatures, are set as explained above using the programming steps that are used to set the generally desired temperature setpoints and time periods. The vacation setpoints are maintained in all zones when the zone selector switch 26 is in the vacation mode.

While the present invention has been described in detail with reference to the illustrative embodiment, many modifications and variations would present themselves skilled in the art without the parting from the true spirit and scope of the invention.

What is claimed is:

1. A temperature control system for maintaining the temperature in each zone of a plurality of zones at predetermined set points for predetermined time periods by controlling the air flow into each zone comprising:

a master programmable thermostat positioned in a first zone and having a first damper associated therewith;

at least one slave thermostat positioned in at least a second zone and having at least a second damper associated therewith;

said master programmable thermostat having programming means for setting a first desired temperature to be maintained in said first zone and at least a second desired temperature to be maintained in at least a second zone, and for setting a first time period and at least a second time period for the respective desired temperatures, said programming means having means for setting a third desired temperature to be maintained in said first zone for a third time period and at least a fourth desired temperature to be maintained in said at least second zone for a fourth time period for controlling said first damper and said at least a second damper to control the air flow into the respective zones, and program temperature override means associated with said master programmable thermostat and said at least one slave thermostat for changing the current set desired temperature in a respective zone and only for the current programmed set time period, whereupon at the end of the current programmed set time period the next previously programmed set desired temperature and set time period will be maintained.

2. A temperature control system as set forth in claim 1 wherein said master programmable thermostat further comprises a temperature hold means including manually operated hold means for maintaining the current set desired temperatures in each zone until said program temperature hold means is reset, whereupon the previously programmed set desired temperatures and time periods will be maintained.

3. A temperature control system as set forth in claim 2 wherein said master programmable thermostat further comprises a programmable temporary temperature means including program temperature setpoint adjustment means manually operated for changing the set desired temperatures in all zones for all programmed set time periods to a set predetermined desired temporary temperature until said program temperature adjustment means is reset.

* * * * *